(12) United States Patent
Shochet

(10) Patent No.: US 6,232,979 B1
(45) Date of Patent: *May 15, 2001

(54) METHOD, SYSTEM, AND COMPUTER PROGRAM PRODUCT FOR FAST COMPUTATION USING PARALLEL MULTI-CHANNEL RESAMPLING AND BLENDING

(75) Inventor: Ofer Shochet, Tel-Aviv (IL)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,138

(22) Filed: Dec. 19, 1997

(51) Int. Cl.[7] .................................................. G06T 15/50
(52) U.S. Cl. ........................................... 345/430; 345/153
(58) Field of Search .................................... 345/430–432, 345/440, 441, 503, 505, 506, 523–525, 153, 155

(56) References Cited

U.S. PATENT DOCUMENTS

| | | | |
|---|---|---|---|
| 4,216,526 | 8/1980 | Karwowski | 364/414 |
| 4,222,104 | 9/1980 | Moore | 364/414 |
| 4,223,384 | 9/1980 | Hounsfield et al. | 364/414 |
| 4,250,387 | 2/1981 | Hounsfield et al. | 250/445 |
| 4,398,251 | 8/1983 | LeMay | 364/414 |
| 4,639,941 | 1/1987 | Hounsfield | 378/11 |
| 4,843,618 | 6/1989 | Best et al. | 378/4 |
| 5,388,206 | * 2/1995 | Poulton et al. | 345/505 |

OTHER PUBLICATIONS

Foley, *Computer Grahics*, Addison–Wesley Publishing, 1996, pp. xvii–xxiii and 855–922.

(List continued on next page.)

*Primary Examiner*—Mark R. Powell
*Assistant Examiner*—Thu Nguyen
(74) *Attorney, Agent, or Firm*—Sterne, Kessler, Goldstein & Fox P.L.L.C.

(57) ABSTRACT

A method, system, and computer program product are provided for fast computation using parallel resampling and blending in multi-channel texture mapping. In one embodiment, slices of projection data for volume rendering are loaded into multiple textures. The loaded textures are combined using multi-channel texture mapping to obtain a multi-channel data frame for storage in a multi-channel frame buffer. The multiple textures are combined using a texture mapping operation that includes a linear blending operation, such as, a maximum, minimum, and/or sum blending operation. Multi-channel frame buffer data is then aggregated to obtain a final single channel grey-level output of pixel data. In one example implementation of the present invention, a load unit loads slices of projection data into multiple textures. A multi-channel texture engine combines the multiple textures to obtain multi-channel frame data for storage in a multi-channel frame buffer. The texture engine performs a texture mapping operation using a linear blending operation, such as, a maximum, minimum, and/or sum blending operation. An aggregation unit, such as a summer unit, aggregates the multi-channel frame buffer data to obtain a final single channel grey-level output of pixel data. The present invention leverages the parallel resampling and blending operations available in multi-channel texture engines so that fewer resampling operations are required in computational tasks, such as, volume rendering of projection data.

17 Claims, 4 Drawing Sheets

OTHER PUBLICATIONS

Cabral et al., "Accelerated Volume Rendering and Tomographic Reconstruction Using Texture Mapping Hardware", Proceedings of ACM/IEEE Symposium on Volume Visualization (IEEE CS Press), 1994, pp. 91–98.

Drebin et al., "Volume Rendering", *Computer Graphics*, vol. 22, No. 4, Aug. 1988, pp. 65–74.

Azevedo, Stephen G., Brian K. Cabral and James Foran, Silicon Graphics Computer Systems, "Tomographic image reconstruction and rendering with texture–mapping hardware", SPIE vol. 2299, pp. 280–291.

The Cube Project (visited Jan. 21, 2000), <http://www.cs.sunysb.edu/–vislab/projects/cube/cube.html>, 1 page.

Motivation (visited Jan. 21, 2000), <http://www.cs.sunysb.edu/–vislab/projects/cube/motivation.html>, 3 pages.

Cube Project –Publications (visited Jan. 21, 2000), <http://www.cs.sunysb.edu/–vislab/projects cube/cubePapers.html>, 4 pages.

Osborne et al., "EM Cube: An Architecture for Low Cost real–Time Volume Rendering" Proceeding of the 1997 SIGGRAPH/Eurographics workshop on Graphics hardware. Aug. 1997.*

Hesser et al., "Three Architectures for Volume Rendering", Proceeding of Eurographics, 1995.*

Pfister et al., "real–Time Architecture for High–Resolution volume Visualization", 1994 Workshop on Volume Visualization.*

* cited by examiner

METHOD, SYSTEM, AND COMPUTER PROGRAM PRODUCT FOR FAST COMPUTATION USING PARALLEL MULTI-CHANNEL RESAMPLING AND BLENDING

CROSS-REFERENCE TO RELATED APPLICATION

This patent application is related to the following commonly owned, co-pending United States utility patent application:

"Method, System, and Computer Program Product for Increasing Interpolation Precision Using Multi-Channel Texture Mapping," by Ofer Shochet Appl. No. (to be assigned), (Atty. Docket No. 15-4-556.00/1452.2510000), filed Oct. 9, 1997 (incorporated herein by reference).

BACKGROUND OF THE INVENTION

1. Field of the Invention

The present invention relates to computer data processing and graphics, and in particular, to computational tasks including, but not limited to, volume rendering and image processing operations.

2. Related Art

Three-dimensional arrays of digital data representing spatial volumes arise in many applications. Computed tomography (CT) and magnetic resonance (MR) scanners create a volume by imaging a series of cross-sections, also called slices. Astrophysical, meteorological, and geophysical measurements, and business or economics data also naturally lead to a volume data set. Computer graphics systems use a volume rendering algorithm to display a visualization of a volume. See, R. Drebin, L. Carpenter, and P. Hanrahan, "Volume Rendering," *Computer Graphics*, Vol. 22, No. 4, (SIGGRAPH '88, Atlanta, Ga.), August 1988, pp. 65–74 (incorporated in its entirety herein by reference); and B. Cabral, N. Cam and J. Foran, "Accelerated Volume Rendering and Tomographic Reconstruction Using Texture Mapping Hardware," *Proceedings of ACM/IEEE Symposium on Volume Visualization* (IEEE CS Press), pp. 91–98, 1994 (Order No. PR07067, 1995)(incorporated in its entirety herein by reference); and the co-pending, commonly-owned U.S. patent application by B. Cabral and J. Foran, "*A System and Method of Performing Tomographic Reconstruction and Volume Rendering Using Texture Mapping*," filed Jul. 7, 1995, Appl. Ser. No. 08/499,614 (SGI Ref. No. 15-4-148.00, SKGF Ref. No. 1452.0420000) (incorporated in its entirety herein by reference).

In computer graphics platforms, the re-sampling speed limits fast volume-rendering. For example, one common volume rendering approach uses maximum intensity projection for volume rendering. In one implementation of this type of volume rendering, slices Si are first assumed to be parallel to a viewpoint. For example, as shown in FIG. 1, eight slices S1 to S8 can be used as a volume data set. Slices S1 to S8 each have m bits of grey-scale channel data representing corresponding MR scan cross-section images. For example, grey-scale data can represent pixel intensity ranging from black to white using a single digital value, such as 0 to 256, where 0 represents black and 256 represents white and 1 to 255 represent progressive intermediate shades of grey.

Each slice S1 to S8 is then loaded as a separate one-channel luminance texture (total 8 one-channel textures). The textures for slices S1 to S8 are then drawn on top of each other successively using blending. For example, in a system supporting a graphics application programming language, such as OpenGL™ manufactured by Silicon Graphics, Inc., a blending function can be set to draw each slice one on top of the other. Consequently, resampling is performed for each slice in succession and the result is stored in a frame buffer prior to being displayed. Each successive resampling operation which must be performed slows overall volume rendering time.

What is needed is a method, system and computer program product for fast computation that increases resampling and blending speed. The number of successive resampling operations which must be performed needs to be reduced.

SUMMARY OF THE INVENTION

A method, system, and computer program product are provided for fast computation using parallel resampling and blending in multi-channel texture mapping. According to one embodiment of the present invention, slices of projection data for volume rendering are loaded into multiple textures. The loaded textures are combined using multi-channel texture mapping to obtain a multi-channel data frame for storage in a multi-channel frame buffer. Preferably, the multiple textures are combined using a texture mapping operation that includes a linear blending operation, such as, a maximum, minimum, and/or sum blending operation. Multi-channel frame buffer data is then aggregated to obtain a final single channel grey-level output of pixel data.

In one example implementation of the present invention, a load unit loads slices of projection data into multiple textures. A multi-channel texture engine combines the multiple textures to obtain multi-channel frame data for storage in a multi-channel frame buffer. Preferably, the texture engine performs a texture mapping operation using a linear blending operation, such as, a maximum, minimum, and/or sum blending operation. An aggregation unit, such as a summer unit, aggregates the multi-channel frame buffer data to obtain a final single channel grey-level output of pixel data.

For example, eight slices of maximum intensity projection volume data can be loaded into two four-channel textures, e.g., two RGBA (red, green, blue, alpha) textures. Two RGBA textures are combined into a single multi-channel data frame using parallel multi-channel texture mapping. A linear blending function can be set to a maximum (or minimum) and sum function. The result is that after texture mapping, each red, green, blue and alpha channel in the frame buffer will contain pixel data representing the maximum of two corresponding slices. An aggregation operation is then performed on each RGBA channel in the frame buffer to obtain a final single channel grey-level output.

The present invention leverages the parallel resampling and blending operations available in multi-channel texture engines so that fewer resampling operations are required in volume rendering of projection data or any other computational task. For example, the present invention decreases the number of resampling operations by a factor of four in the case of volume rendering of eight slices of projection data using a four-channel texture engine. In other words, the present invention improves resampling speed approximately four-fold in the case of volume rendering of eight slices of projection data using a four-channel texture engine.

The present invention is described primarily with respect to an example volume rendering embodiment. As would be apparent to a person skilled in the art given this description, the present invention can be used for any computational task including, but not limited to, fast volume rendering and image processing. The present invention can be used on any type of single channel or dual-channel data. In other words, any single or dual channel data can be loaded or split into multi-channel texture data and then rendered, image-processed, blended, and/or accumulated. The final result is then aggregated back into the original number of channels, e.g. back into single channel or dual channel data.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
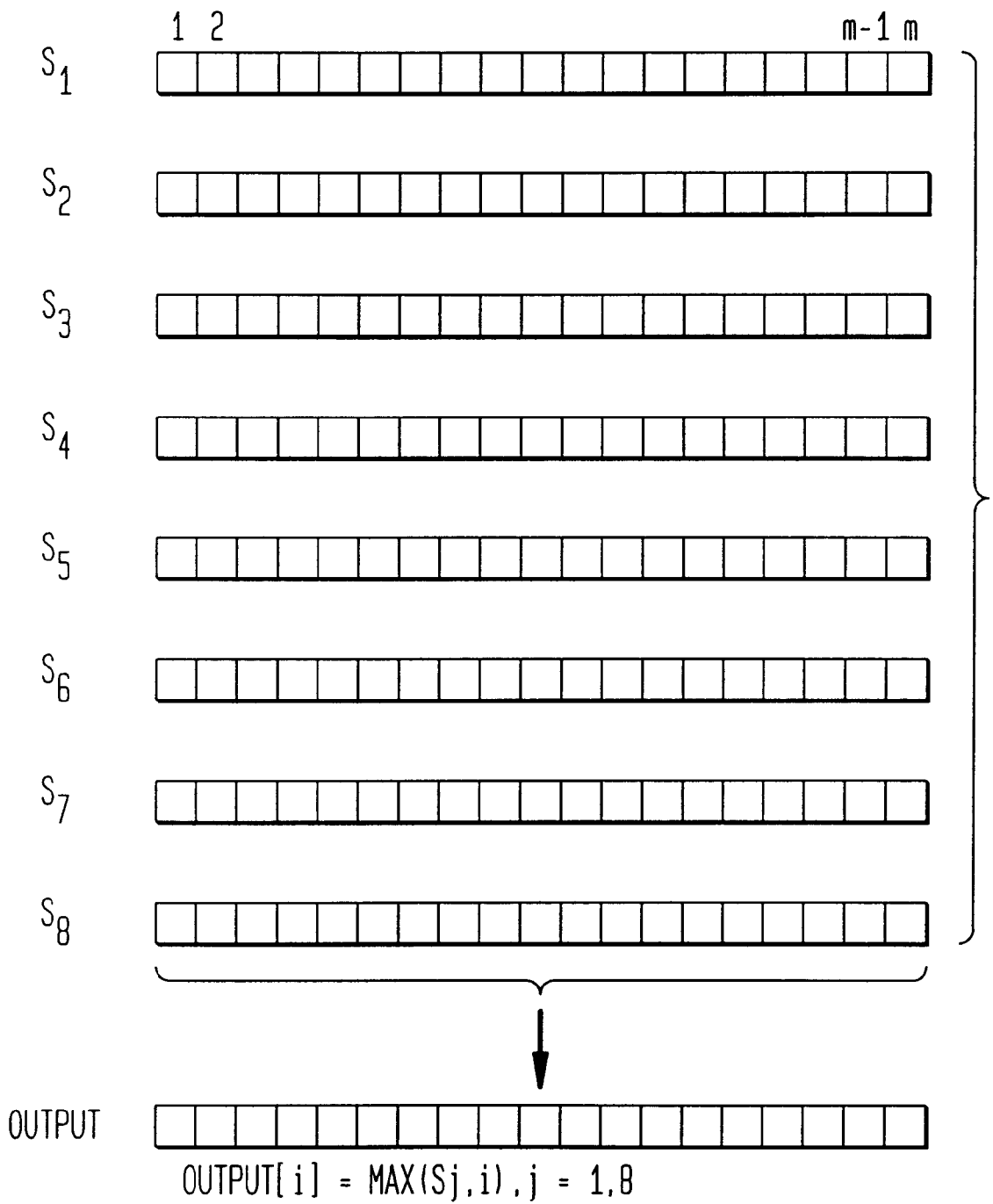
FIG. 1 is a diagram illustrating conventional multi-channel resampling of data by a maximum intensity projection volume rendering algorithm.

The present invention is described with reference to the accompanying drawings. An effort is made to adhere to the following convention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 2A:
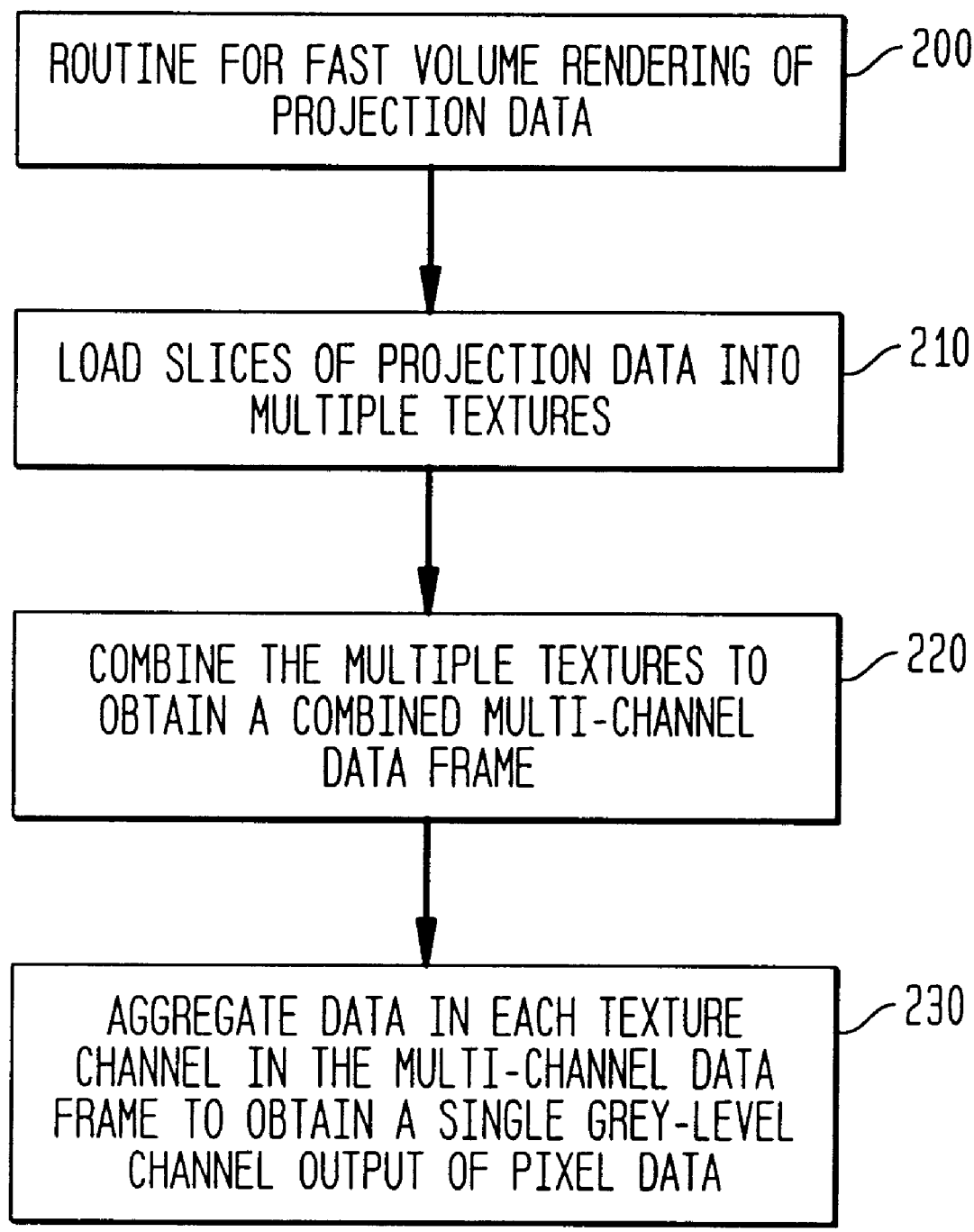
FIG. 2A is a flowchart of an routine for fast volume rendering using parallel multi-channel resampling and blending according to one embodiment of the present invention.
Figure 2B:
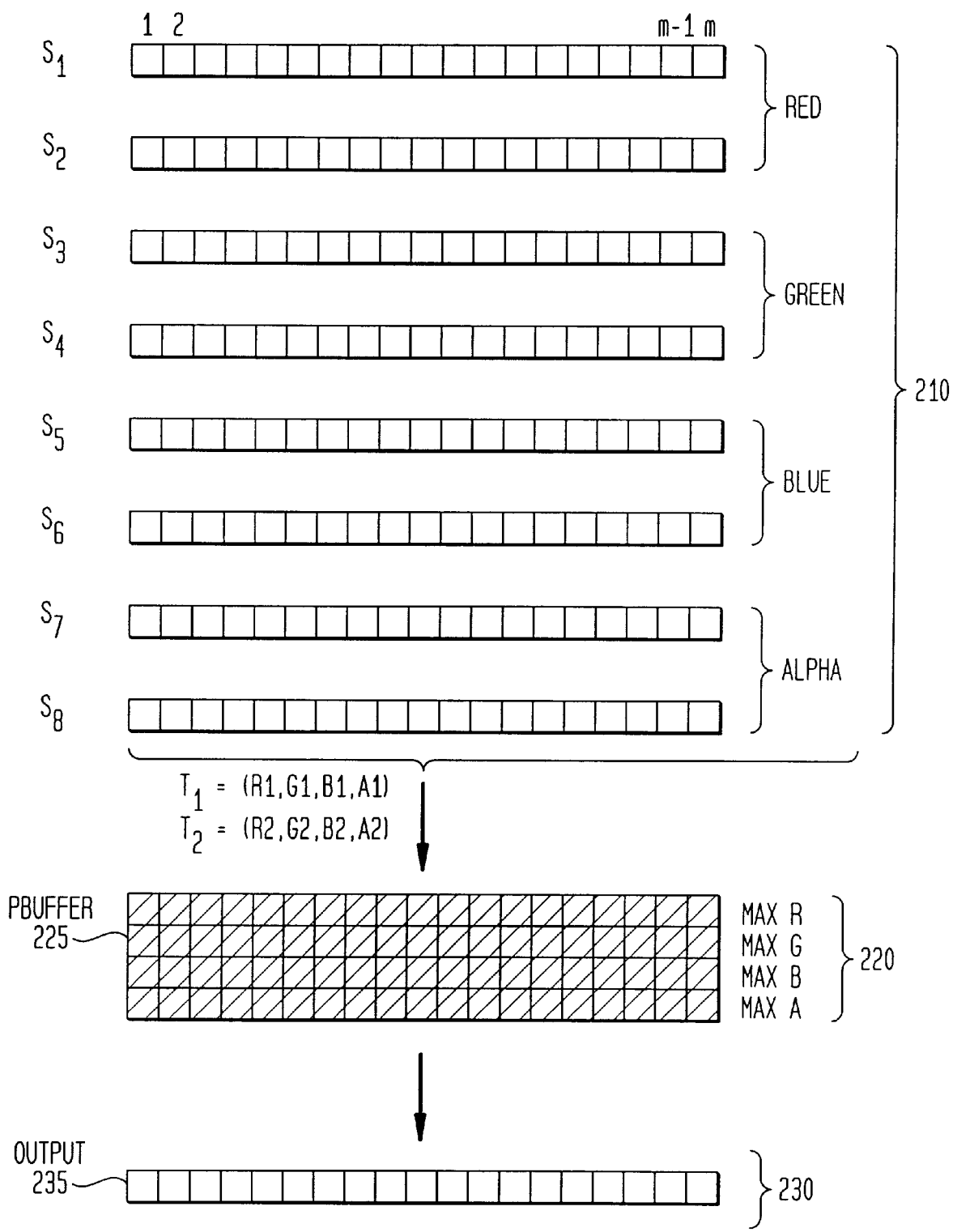
FIG. 2B is a diagram illustrating parallel multi-channel resampling and blending of data in one example operation of the routine of FIG. 2A.

A method, system, and computer program product are provided for fast computation using parallel resampling and blending in multi-channel texture mapping. FIG. 2A is a flowchart of a routine 200 for fast volume rendering using parallel multi-channel resampling and blending according to one embodiment of the present invention (steps 210–230). FIG. 2B is a diagram illustrating parallel multi-channel resampling and blending of data in one example operation of the routine 200. For clarity, the operation of routine 200 will be described in parallel with the example data shown in FIG. 2B.

A texture is an image represented by texels in texture space (or pixels in screen space). In multi-channel texture mapping, each texel can have values representing respective texture channel values. For example, in a four-channel (RGBA) texture mapping system having red, green, blue, and alpha texture channels, each texel in a single texture has a red, green, blue, and alpha value (R,G,B,A).

In step 210, slices of projection data to be volume rendered are loaded into texture channels of one or more multi-channel textures. Each slice of projection data is texture mapped into one texture channel of a texture. Each multi-channel texture has more than one texture channel. Therefore, a single multi-channel texture can hold more than one slice of projection data. The number of multi-channel textures required to load a given number of slices of projection data depends upon the number of texture channels used in each texture; however, the number of multiple textures in which the slices are loading is less than the number of slices.

As shown in FIG. 2B, eight slices S1 to S8 are loaded into two four-channel textures, e.g., two RGBA (red, green, blue, alpha) textures. The first texture (T1) consists of red channel data R1, green channel data G1, blue channel data B1, and alpha channel data A1. The second texture (T2) consists of red channel data R2, green channel data G2, blue channel data B2, and alpha channel data A2.

In step 210, pixel data in slice S1 is loaded as red channel data R1 in the first texture. Pixel data in slice S2 is loaded as red channel data R2 in the second texture. Pixel data in slice S3 is loaded as green channel data G1 in the first texture. Pixel data in slice S4 is loaded as green channel data G2 in the second texture. Pixel data in slice S5 is loaded as blue channel data B1 in the first texture. Pixel data in slice S6 is loaded as blue channel data B2 in the second texture. Pixel data in slice S7 is loaded as alpha channel data A1 in the first texture. Pixel data in slice S8 is loaded as alpha channel data A2 in the second texture.

In step 220, the loaded textures are combined using multi-channel texture mapping to obtain a multi-channel data frame for storage in a multi-channel frame buffer. In one preferred example, the multiple textures are combined using a texture mapping operation that includes a linear blending operation, such as, a maximum, minimum, and/or sum blending operation. In this way, each texture channel will be resampled independently and maximized.

In the example of FIG. 2B, loaded textures T1 and T2 are combined in step 220 using parallel multi-channel texture mapping into a combined data frame which is stored in a multi-channel frame buffer (pbuffer 225). A linear blending function is set to perform a maximum (or minimum) and sum function on texels in each of the texture T1 and T2. The result is that after step 220, the Pbuffer red channel will contain pixel data (MaxR) representing the maximum of slices S1 and S2. The Pbuffer green channel will contain pixel data (MaxG) representing the maximum of slices S3 and S4. The Pbuffer blue channel will contain pixel data (MaxB) representing the maximum of slices S5 and S6. The Pbuffer alpha channel will contain pixel data (MaxA) representing the maximum of slices S7 and S8.

In step 230, multi-channel frame buffer data is aggregated in each texture channel to obtain a final single channel grey-level output of pixel data. In the example of FIG. 2B, an aggregation operation, such as, a summing operation, is performed on each RGBA channel in pbuffer 225 to obtain a final single channel grey-level output 235.

The present invention is not intended to be limited to a four-channel (RGBA) texture engine. In general, any number and combination of different texture channels can be used. For example, slices can be loaded in step 210 into two texture channels of a texture engine, such as, luminance and alpha texture channels. In this case, eight slices S1 to S8 are loaded into four two-channel textures, each two-channel texture having luminance and alpha texture channels. Each two-channel texture can therefore hold two different slices of projection data (one slice is texture mapped into each texture channel). Steps 220 and 230 are carried out in using multi-channel texture mapping on each of the four textures similar to that described above with respect to FIGS. 2A and 2B.

Routine 200 and its constituent steps 210, 220, and 230 can be implemented in software, firmware, hardware, and any combination thereof.

By taking advantage of the parallel resampling and blending operations available in multi-channel texture engines, fewer resampling operations are required in volume rendering of projection data or any other computational task. For example, the present invention decreases the number of resampling operations by a factor of four in the case of volume rendering of eight slices of projection data using a four-channel texture engine. In other words, the present invention improves resampling speed approximately four-fold in the case of volume rendering of eight slices of projection data using a four-channel texture engine. Resampling speed is improved by the present invention approximately two-fold in the case of volume rendering of eight slices of projection data using a two-channels of a texture engine.

Routine 200 as described above can be used with any volume renderer using two-dimensional and/or three-dimensional texture. Fast volume rendering according to the present invention can include linear volume rendering where a viewpoint is perpendicular to slices as described above.

Alternatively, non-linear volume rendering data can be used where a volume is rotated relative to a viewpoint. In non-linear volume rendering (front-to-back or back-to-front) the volume data is first divided into partial bricks in each texture channel. A "partial brick" represents a portion of a slice that is to be rendered within a display as observed from a particular viewpoint. Instead of using the intensity for each slice as in MIP, the intensity and opacity of each partial brick is needed in order to blend the partial bricks. To render different slices away from their exact spatial position, however, can require geometry incorporation using z-buffering or the use of clipping planes. Using clipping planes requires first dividing the volume data set into partial bricks.

Figure 3:
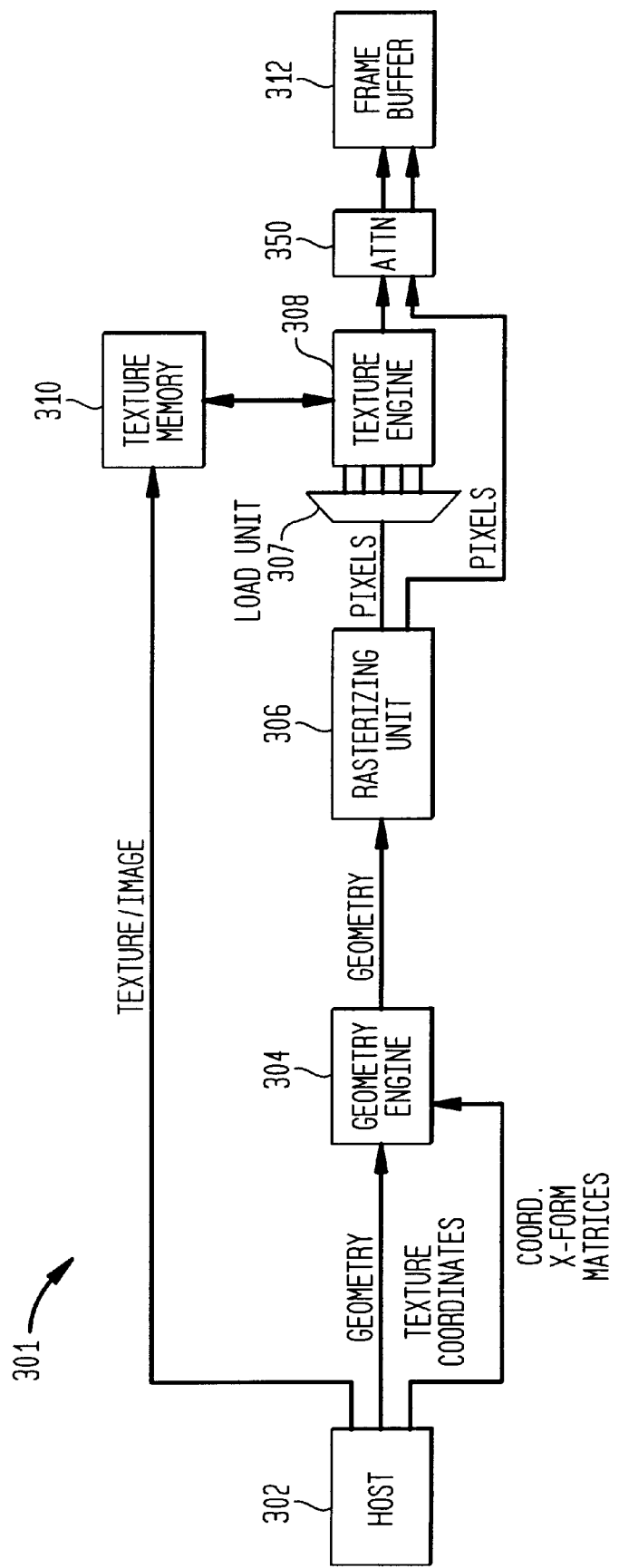
FIG. 3 is a block diagram that shows an example graphics system that supports fast volume rendering using parallel multi-channel resampling and blending according to one embodiment of the present invention.

FIG. 3 is a block diagram for supporting parallel multi-channel resampling and blending in a computer tomography (CT) and imaging system 301 according to one embodiment of the present invention. Computer tomography (CT) and imaging system 301 includes a host computer 302, geometry engine 304, rasterizing unit 306, texture engine 308, texture memory 310, attenuation unit 350, and frame buffer 312. Texture engine 308 is a multi-texture channel texture engine. Interpolation can be performed in multiple texture channels as part of standard texture mapping operations. The general operation of each of these components is well-known in graphics processing and CT imaging, and described in detail, for example, in the commonly-owned, co-pending U.S. patent application by Cabral and Foran (Appl. Ser. No. 08/499, 614), incorporated by reference herein above.

To implement routine 200, computer tomography (CT) and imaging system 301 further includes a load unit 307. In one embodiment, load unit 307 performs step 210 on slices of projection data as described above. The slices of projection data can be output from geometry engine 304 and/or rasterizing unit 306 pursuant to any known volume rendering algorithm. Alternatively, a user can perform step 210 directly (e.g., loading/downloading or scanning in slices of projection data) or through programming so that slices of projection data are loaded into multiple textures.

Steps 220 and 230 are then carried out in texture engine 308 using standard parallel texture mapping and linear blending operations, as described herein.

Steps 210 to 230 can be implemented in software, firmware, and/or hardware in one or more processing components. For example, any host or graphics processor can be used to implement routine 200 in software running on a processor(s). In the example of FIG. 3, host 302 can implement step 210 by controlling pixels (e.g., the slices of projection data) passed to load unit 307. Load unit 307 can be any type of processing logic structure (or program code executing on host 302 or within texture engine 308) for loading slices into texture channels as described with respect to step 210. Texture engine 308 can texture map each slice of projection data into multi-channel textures.

Texture engine 308 carries out steps 220 and 230 in software, firmware, and/or hardware. A blending unit (not shown) can perform a linear blending function set to perform a maximum (or minimum) and sum function on texels in the loaded textures (e.g., T1 and T2). An aggregation unit (not shown) can be implemented as processing logic (or program code in host 302 or texture engine 308) for performing an aggregation operation such as a sum over all texture channels.

Routine 200 can also be implemented in any computer graphics application programming language, including but not limited to, OpenGL™ manufactured by Silicon Graphics, Inc. For example, as would be apparent to a person skilled in the art given this description, a load operation in step 210 can be carried out using OpenGL™ commands to load two textures T1 and T2. Step 220 can be carried out using OpenGL™ texture mapping and blending commands to texture map loaded textures T1, T2. Step 230 can be carried using OpenGL™ commands, such as "glCopyPixels" and "ColorMatrix," to move the separate channels on top of each other and to sum the result.

For clarity, the above embodiment and example are described primarily with respect to projection data, such as maximum intensity projection data. Volume data can be used for fast volume rendering using parallel multi-channel resampling and blending as described herein. The present invention is especially advantageous for applications, such as medical imaging, where volume data is provided in a single channel and only grey-level output is needed for rendering and display. However, the present invention is not intended to be so limited.

As would be apparent to a person skilled in the art given this description, the present invention can be used for any computational task including, but not limited to, fast volume rendering and image processing. The present invention can be used on any type of single channel or dual-channel data. Any single or dual channel data can be loaded or split into multi-channel texture data and then rendered, image-processed, blended, and/or accumulated. The final result is then aggregated back into the original number of channels, e.g. back into single channel or dual channel data.

The present invention is further described in terms of an example computer graphics processing environment. As described herein, the present invention can be implemented as software, firmware, hardware, or any combination thereof. In general, fast volume rendering according to the present invention can be used for any type of data and is not intended to be limited by the examples described herein. Computer graphics processing using parallel multi-channel texture mapping is used to perform the fast volume rendering irrespective of whether any further graphics processing or display is needed.

Given the description herein, it would be readily apparent to one skilled in the art to implement the present invention in any computer graphics application, application programming interface (API), platform, or system that supports parallel multi-channel texture mapping including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). Any computer graphics architecture that supports a limited precision multi-channel texture engine can be used including, but not limited to, an Open GL™ graphics API architecture (including but not limited to Infinite Reality, Indigo$^2$, Indy, Octane, Onyx, or O$_2$ graphics workstations manufactured by Silicon Graphics, Inc.) and raster graphics architectures such as those described in Foley et al., *Computer Graphics*, Addison-Wesley Publishers, U.S.A. (1996), chapter 18, pp. 855–922 (incorporated herein by reference). Calculations can be performed in fixed-point or floating point arithmetic.

Of course, these specific computer graphics systems are recited as examples which can support the present invention, but do not necessarily have to have the present invention to operate. For example, an Open GL™ graphics API architecture does not require use of the present invention. In other words, an Open GL™ graphics API architecture can provide volume rendering or other computation without using the advantages of the present invention as described herein.

Description in these terms is provided for convenience only. It is not intended that the invention be limited to application in this example environment. In fact, after reading the following description, it will become apparent to a person skilled in the relevant art how to implement the invention in alternative environments.

As mentioned above, the present invention can be implemented using software running (that is, executing) in an environment similar to that described above. In this document, the term "computer program product" is used to generally refer to a removable storage unit or a hard disk installed in hard disk drive. These computer program products are means for providing software to a computer system (e.g. host 302).

Computer programs (also called computer control logic) are stored in main memory and/or secondary memory. Computer programs can also be received via communications interface. Such computer programs, when executed, enable the computer system to perform the features of the present invention as discussed herein. In particular, the computer programs, when executed, enable a processor to perform the features of the present invention. Accordingly, such computer programs represent controllers of a computer system.

In an embodiment where the invention is implemented using software, the software may be stored in a computer program product and loaded into a computer system using a removable storage drive, hard drive, or communications interface . Alternatively, the computer program product may be downloaded to computer system over a communications path. The control logic (software), when executed by a processor, causes the processor to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for fast volume rendering of projection data using parallel resampling and blending in multi-channel texture mapping, comprising the steps of:

loading slices of projection data into multiple textures;

combining the multiple textures to obtain a combined multi-channel data frame for storage in a multi-channel frame buffer; and aggregating data in each texture channel in the multi-channel data frame to obtain a single grey-level channel output of pixel data, whereby said combining step reduces the amount of data that is aggregated in said aggregating step.

2. The method of claim 1, wherein said combining step comprises texture mapping the multiple textures using a blending operation that determines a sum of the texels in each texture channel for each of the multiple textures.

3. The method of claim 1, wherein:

said loading step loads eight slices of projection data into two four-channel textures.

4. The method of claim 1, wherein:

said loading step loads eight slices of projection data into four two-channel textures.

5. A system for fast volume rendering of projection data using parallel resampling and blending in multi-channel texture mapping, comprising:

a load unit that loads slices of projection data into multiple textures;

a multi-channel texture engine that combines the multiple textures to obtain a combined multi-channel data frame;

a multi-channel frame buffer that stores the combined multi-channel data frame output from said texture engine; and an aggregation unit that aggregates data in each texture channel in the multi-channel frame buffer to obtain a single grey-level channel output of pixel data, whereby the multi-channel texture engine reduces the amount of data aggregated by the aggregation unit.

6. The system of claim 5, wherein said multi-channel texture engine further includes a blending unit that determines a sum of the texels in each texture channel of said multiple textures.

7. The system of claim 5, wherein:

said loading unit loads eight slices of projection data into two four-channel textures.

8. The system of claim 5, wherein:

said loading unit loads eight slices of projection data into four two-channel textures.

9. A computer program product comprising a computer useable medium having computer program logic recorded thereon for enabling a processor in a computer system to provide fast volume rendering using multi-channel texture mapping graphics hardware, said computer program logic comprising:

a procedure that enables the processor to load slices of projection data into multiple textures; and a procedure that enables the processor to combine the multiple textures to obtain a combined multi-channel data frame for storage in a multi-channel frame buffer; and a procedure that enables the processor to aggregate data in each texture channel in the multi-channel data frame to obtain a single grey-level channel output of pixel data, whereby the procedure that enables the processor to combine the multiple textures reduces the amount of data aggregated by the procedure that enables the processor to aggregate data.

10. A method for fast computation using parallel resampling and blending in multi-channel texture mapping, comprising the steps of:

loading data from at least one original channel into multiple textures;

combining the multiple textures to obtain a combined multi-channel data frame for storage in a multi-channel frame buffer; and aggregating data in each texture channel in the multi-channel data frame to obtain output pixel data returned to said at least one original channel, whereby the combining step reduces the amount of data that is aggregated in the aggregating step.

11. The method of claim 10, wherein said combining step comprises texture mapping the multiple textures using a blending operation that determines a sum of the texels in each texture channel for each of the multiple textures.

12. The method of claim 10, wherein:

said loading step loads data into two four-channel textures.

13. The method of claim 10, wherein:

said loading step loads data into four two-channel textures.

14. A system for fast computation using parallel resampling and blending in multi-channel texture mapping, comprising:

a load unit that loads data from at least one original channel into multiple textures a multi-channel texture engine that combines the multiple textures to obtain combined multi-channel data frame;

a multi-channel frame buffer that stores the combined multi-channel data frame output from said texture engine; and an aggregation unit that aggregates data in each texture channel in the multi-channel frame buffer to obtain output pixel data returned to said at least one original channel, whereby the multi-channel texture engine reduces the amount of data aggregate( by the aggregation unit.

15. The system of claim 14, wherein said multi-channel texture engine further includes a blending unit that determines a sum of the texels in each texture channel of said multiple textures.

16. The system of claim 14, wherein:

said loading unit loads data into two four-channel textures.

17. The system of claim 14, wherein:

said loading unit loads data into four two-channel textures.

* * * * *